Patented Aug. 7, 1934

1,969,481

UNITED STATES PATENT OFFICE 1,969,481

MANUFACTURE OF GROUND GLASS SURFACE ON FILM SUPPORT

Alfred D. Slack, Rochester, N. Y., assignor to Eastman Kodak Company, Rochester, N. Y., a corporation of New York No Drawing. Application January 15, 1932, Serial No. 586,953

12 Claims. (Cl. 91—70)

This invention relates to films of a cellulose derivative the surface of which is rendered translucent and diffusing. This surface resembles, in some respects, a ground glass surface; it is, for example, slightly roughened and capable of taking writing with an ordinary pencil.

The solvent action of solutions of the thiocyanates on cellulose acetate has been known heretofore. I have, however, discovered a new effect which these salts may have, not only on cellulose acetate, but on other cellulose derivatives. I have found that by utilizing a solution of a thiocyanate in water to which has been added some liquid which aids in the penetration of the solution in the film, the salt penetrates the base and on drying with heat a translucent base remains. The alkali thiosulfates are also useful in the same manner.

The salts which are useful in my invention are the thiocyanates and thiosulphates of the alkalies, that is, the thiocyanates of sodium, potassium or ammonium, and the thiosulphates of sodium, potassium or ammonium.

To a water solution of these salts I add a liquid to aid the salts in entering the film. The liquids, anyone of which may be added to the water solutions of the salts in question, I will define as penetrating agents. These liquids are, for example, acetone, methyl alcohol, ethyl alcohol, ethyl lactate, small quantities of triacetine and 28% ammonia. Some of these substances by themselves are solvents of some of the cellulose derivatives. In my invention they are all employed in solutions containing water and under these conditions they serve to swell or soften the surface so that they aid in the penetration of the salts into the surface layer.

The following examples will serve to illustrate the invention:

Example I

The film of cellulose derivative, such as cellulose acetate, is treated with the following solution:

| | |
|---|---|
| Ammonium thiocyanate | 20–25 grams |
| Ammonia, 28% | 30–50 cc. |
| Acetone | 20–10 cc. |
| Water to | 35–15 cc. |

The concentration of the solution to be used is determined by the degree of translucency desired and this effect is controlled to a great extent not only by the concentration of the solution used but by the temperature at which it is used. A temperature of 120° F. to 180° F. will normally be a satisfactory range.

The treatment may be carried out by either immersing the film, by floating it on the surface, or by applying the solution by means of rolls to one or both sides. These methods are all well known.

After treatment in this solution, the film is dried in warm air when it will be found to have acquired a translucent and light diffusing surface.

Example II

The procedure is exactly as before but the solution in which the film is treated is

| | |
|---|---|
| Sodium thiocyanate | 10–15 grams |
| Ammonia, 28% | 85–90 cc. |

Example III

The treatment again is as before in the following solution:

| | Parts by weight |
|---|---|
| Sodium thiosulfate | 15 |
| Glacial acetic acid | 10 |
| Acetone | 20 |
| Water | 55 |

As stated above, the degree of translucency may be varied and controlled by variations in the concentrations of the solutions, by the temperature at which the solution is used, and by the temperature and rate of drying. Any of these may be easily determined however by a few trials which may be on a small scale.

Film made according to my invention is useful for a number of purposes, one of its principal uses being for leaders for motion picture film in which titles or data relating to the pictures may be written in pencil or ink.

While I have illustrated my invention and its application to cellulose acetate, it is to be understood that I include films of any cellulose ester or ether. It is also understood that I consider as included in my invention all modifications and equivalents coming within the scope of the appended claims.

What I claim is:

1. The method of rendering the surface of an extended flexible film of a cellulose derivative translucent and light diffusing which comprises treating the surface of said film with an aqueous solution containing a salt selected from the group consisting of the thiocyanates and the thiosulfates of the alkalies at a temperature of not more than 180° F., and then drying said film.

2. The method of rendering the surface of an extended flexible film of a cellulose organic derivative translucent and light diffusing which comprises treating the surface of said film with an aqueous solution containing a salt selected from the group consisting of the thiocyanates and the thiosulfates of the alkalies at a temperature of not more than 180° F., and then drying said film with the aid of heat.

3. The method of rendering the surface of an extended flexible film of a cellulose organic derivative translucent and light diffusing which comprises treating the surface of said film with an aqueous solution containing a liquid which is a penetrating agent for the film and a salt selected from the group consisting of the thiocyanates and the thiosulfates of the alkalies at a temperature of 120°-180° F., and then drying said film.

4. The method of rendering the surface of an extended flexible film of a cellulose derivative translucent and light diffusing which comprises treating the surface of said film with a hot aqueous solution containing a thiocyanate of an alkali at a temperature of 120°-180° F., and then drying said film with the aid of heat.

5. The method of rendering the surface of an extended flexible film of a cellulose derivative translucent and light diffusing which comprises treating the surface of said film with a hot solution containing a liquid which is a penetrating agent for the film and a thiocyanate of an alkali, and then drying said film with the aid of heat.

6. The method of rendering the surface of an extended flexible film of a cellulose derivative translucent and light diffusing which comprises treating the surface of said film with a hot solution containing a liquid which is a penetrating agent for the film and a thiosulfate of an alkali, and then drying said film with the aid of heat.

7. The method of rendering the surface of an extended flexible film of a cellulose derivative translucent and light diffusing which comprises treating the surface of said film with a hot solution containing acetone and a thiocyanate of an alkali, and then drying said film with the aid of heat.

8. The method of rendering the surface of an extended flexible film of a cellulose derivative translucent and light diffusing which comprises treating the surface of said film with a hot solution containing acetone and ammonium thiocyanate, and then drying said film with the aid of heat.

9. The method of rendering the surface of an extended flexible film of cellulose acetate translucent and light diffusing which comprises treating the surface of said film with a solution containing a liquid which is a penetrating agent for the film and a salt selected from the group consisting of the thiocyanates and the thiosulfates of the alkalies, and then drying said film.

10. The method of rendering the surface of an extended flexible film of cellulose acetate translucent and light diffusing which comprises treating the surface of said film with a hot solution containing acetone and ammonium thiocyanate, and then drying said film with the aid of heat.

11. The method of rendering the surface of an extended flexible film of cellulose acetate translucent and light diffusing which comprises treating the surface of said film with a solution containing acetone, acetic acid and sodium thiosulfate, and then drying said film with the aid of heat.

12. The method of rendering the surface of an extended flexible film of cellulose acetate translucent and light diffusing which comprises treating the surface of said film with a solution containing sodium thiocyanate and ammonia, and then drying said film with the aid of heat.

ALFRED D. SLACK.